US005980681A

United States Patent [19]
Siemroth et al.

[11] Patent Number: 5,980,681
[45] Date of Patent: Nov. 9, 1999

[54] PROCESS FOR TREATMENT OF METAL WORKPIECE SURFACE BY ELECTRICAL DISCHARGES

[75] Inventors: Peter Siemroth; Bernd Schultrich, both of Dresden; Horst Kleinert, Ottendorf-Okrilla; Sven Grosser, Arnsdorf, all of Germany

[73] Assignee: Fraunhofer-Gesellschaft, Munich, Germany

[21] Appl. No.: 08/929,112

[22] Filed: Sep. 15, 1997

[51] Int. Cl.$^6$ .................................................. B32B 31/00
[52] U.S. Cl. .................. 156/272.6; 156/153; 156/272.2; 156/273.3; 156/281; 29/90.01; 219/76.13; 219/76.14
[58] Field of Search ............................... 156/272.2, 273.3, 156/272.6, 153, 281; 219/76.13, 76.14; 29/90.01

[56] References Cited

U.S. PATENT DOCUMENTS

| | | |
|---|---|---|
| 3,832,514 | 8/1974 | Antonov . |
| 4,374,694 | 2/1983 | Blenner et al. ........................ 156/272.6 |
| 4,396,450 | 8/1983 | Blenner et al. ........................ 156/272.6 |
| 4,511,419 | 4/1985 | Kuhlmann et al. .................... 156/272.6 |
| 4,551,603 | 11/1985 | Rocklin ................................ 219/76.13 |
| 4,931,613 | 6/1990 | Salsgiver et al. . |

FOREIGN PATENT DOCUMENTS

| | | | |
|---|---|---|---|
| 1222241 | 8/1966 | Germany ............................ 156/273.3 |
| 34 03 894 | 7/1985 | Germany . |
| 36 18 412 | 12/1987 | Germany . |
| 40 12 086 | 6/1991 | Germany . |
| 42 25 106 | 2/1994 | Germany . |
| 43 03 077 | 8/1994 | Germany . |

OTHER PUBLICATIONS

J.–L. Meunier and M.G. Drouet, "Experimental Study of the Effect of Gas Pressure on Arc Cathode Erosion and Redeposition in He, Ar, and SF from Vacuum to Atmospheric Pressure," IEEE Trans. Plasma Sci. vol. PS–15, (1987), pp. 515–519.

A.E. Guile and B. Juettner, "Basic Erosion Processes of Oxidized and Clean Metal Cathodes by Electric Arcs," IEEE Trans. Plasma Sci. vol. PS–8 (1980), pp. 259–269.

Larikov, L.N. et al., "The Formation of an Amorphous Layer on $Fe_{86}B_{14}$ Alloy Under the Effect of a Spark Discharge," Metals Abstracts, vol. 16, Apr. 1983, p. 183, No. 56–0373; Metallofizika, 6 (1982) 4, 92–93.

L.P. Harris, "Arc Cathode Phenomena" in: J.M. Lafferty (Editor), "Vacuum Arcs, Theory and Application," Wiley, NY, 1980.

O. Hahn, B. Motzko, "Influence of the Process Parameters of SACO Surface Treatment on the Properties of Glued Stanless–Steel Connections," convention proceedings, Swissbonding 1994.

*Primary Examiner*—Jeff H. Aftergut
*Attorney, Agent, or Firm*—Evenson, McKeown, Edwards & Lenahan, P.L.L.C.

[57] ABSTRACT

A process and an apparatus that can be used for surface preparation and treatment of a metal workpiece surface, for example in a processing stage prior to adhesive assembly, without using environmentally harmful materials. The process comprises triggering and maintaining pulsed unipolar arc discharges between an electrode wired as an anode and a workpiece surface wired as a cathode, with the arc discharges following one another with a timing, number, and speed such that they do not cause macroscopic melting of the workpiece surface while ensuring complete extinction of the individual arc discharges. The apparatus comprises an electrode as the anode and the workpiece as the cathode, and a generator or component for generating electrical pulses.

21 Claims, 3 Drawing Sheets

PROCESS FOR TREATMENT OF METAL WORKPIECE SURFACE BY ELECTRICAL DISCHARGES

BACKGROUND AND SUMMARY OF THE INVENTION

This application claims the priority of German patent document DE 196 37 513.4, the disclosure of which is expressly incorporated by reference herein.

The invention relates to the field of mechanical engineering and metallurgy, and concerns a process and an apparatus for treatment of metal workpiece surfaces by electrical discharges, like those that can be used advantageously for subsequent adhesive assembly for example, by gluing or welding for example, or for combined assembly processes, for example gluing, resistance welding, or adhesive and shaping connections.

A number of problems arise in conjunction with gluing metal surfaces in industrial manufacturing. The most important condition for firm adhesion consists in the molecules of the adhesive being able to penetrate the surface of the substrate to a degree that allows the adhesion forces to become effective. Therefore, metal surfaces must be free of impurities (grease, oil, dust, and dirt). This is followed by mechanical pretreatment (brushing, blasting) and frequently by chemical pretreatment as well.

Because of the high, long-term stability that can be achieved in this fashion, classical chromium-sulfuric acid anodization for aluminum alloys has been employed largely unchanged for decades. This is especially the case in the aircraft industry. In order to make adhesive connections more stable with respect to environmental factors and especially to prevent breaks in adhesion caused by water diffusing inward, primer systems have been developed as adhesion promoters that are applied in very thin layers in order not to affect the overall behavior of the connection adversely. Epoxy resins have been the dominant adhesives for joining aluminum parts since the 1950s, said resins curing at temperatures of about 120° C. and with relatively low applied pressures (approximately 1 bar). Special adhesives have been developed for gluing steel panels in the automobile industry, said adhesives being suitable for automatic manufacturing, medically safe, and resistant to oil to a limited degree.

Despite the very high level of technological development of industrial adhesives overall, there are still several important shortcomings. Thus, pretreatment usually involves several costly worksteps and, to some extent, the use of chemicals that are medically objectionable or are problematic from the environmental standpoint. In addition, many technical solutions that have proven successful in manufacturing cannot be transferred to repair.

As an alternative to purely chemical processes, chemical and physical surface treatment processes are also employed that are much more advantageous as far as their environmental compatibility is concerned. In this connection, we can mention in particular the process of blast coating known by the name of SACO (O. Hahn, B. Motzko, "Influence of the Process Parameters of SACO Surface Treatment on the Properties of Glued Stainless-Steel Connections," convention proceedings, Swissbonding 1994). In the SACO process, a corundum grain is used as the blasting medium, said grain being enclosed in a layer of silicate. When this abrasive strikes the surface of the substrate to be treated, a portion of the kinetic energy is converted into heat, and the silicate coating of the corundum grain suddenly breaks free of the grain and becomes firmly anchored in the substrate being blasted. The advantage of this process is that adhesion to the adhesive is largely independent of the material of which the parts being assembled are composed, since the adhesion is produced by the intermediate silicate layer. Thus, even materials that are conventionally difficult to glue together can be joined firmly to each other.

The problem that arises in this process is the development of dust that is necessarily associated with a blasting process, and which necessitates special work protection measures (particle sizes 1 to 10 $\mu$m). This pretreatment therefore requires special shielding that makes it more difficult to use for repairs and makes it impossible to integrate into automated production processes.

Processes for treatment of surfaces of metal workpieces by means of electrical discharges under atmospheric pressure are described in a number of places in the literature and have been proposed for various applications.

While the processes at the cathode of a vacuum arc discharge have been studied for a long time (L. P. Harris, "Arc Cathode Phenomena," in: J. M. Lafferty (Editor), "Vacuum Arcs, Theory and Application," Wiley, NY, 1980) and DC arcs in air have been used for a variety of applications (welding technology, switches), the processes that take place during brief arc discharges in a gas atmosphere at the cathode application point have thus far been investigated to only a limited extent. Such short-term discharges are characterized by the fact that no macroscopic arc application point constituting a liquid melt can form on the cathode, and the development of cathode erosion is characterized by the same microscopic craters as with a vacuum arc. Various characteristic erosion patterns develop as a function of the state of the surface (A. E. Guile and B. Jüttner, "Basic Erosion Processes of Oxidized and Clean Metal Cathodes by Electric Arcs," IEEE Trans. Plasma Sci. Vol. PS-8 (1980), pp. 259–269). Depending on the type of gas and the duration of the discharge, net erosion decreases inversely with gas pressure (J. -L. Meunier and M. G. Drouet, "Experimental Study of the Effect of Gas Pressure on Arc Cathode Erosion and Redeposition in He, Ar, and SF from Vacuum to Atmospheric Pressure," IEEE Trans. Plasma Sci. Vol. PS-15, (1987), pp. 515–519). It has also been observed that an amorphous layer whose corrosion resistance is definitely higher than that of the basic material forms under the influence of brief arc discharges (Larikov, L. N. et al., "The Formation of an Amorphous Layer on $Fe_{86}B_{14}$ Alloy Under the Effect of a Spark Discharge," Metals Abstracts, Vol. 16, April 1983, p. 183, No. 56-0373; Metallofizika, 6 (1982) 4, 92–93). Technical applications, especially for adhesion technology, have thus far not been derived from these physical studies.

U.S. Pat. No. 4,931,613 describes a process for improving the strength characteristics of steels containing silicon with the aid of electrical discharges. The processing electrode is kept constantly in contact with the workpiece in order to trigger a plurality of discharges by means of a pulsed current source. When the discharge is produced in this fashion, it is important to remember that the processing electrode likewise is severely eroded, and material is transferred from said electrode to the workpiece.

German patent document DE 36 18 412 A1 describes a process for treating objects using electrical high voltage discharges, with the goal being to use the electrical field of the discharge to accelerate gas components against the surface of the object. This process therefore involves chemical treatment of the surface of the workpiece using an electrically activated gas (ozone, radicals, ions), with cratering being considered a disturbing effect. Another problem that arises in this connection is that such treatment creates large quantities of byproducts that are hazardous to health (especially $NO_x$ and $O_3$).

German patent document DE 42 25 106 A1 describes a process for producing a metal-plastic bond, especially for dental prostheses, with an adhesion-promoting oxide layer being formed on a metal part, said layer then being bonded with a dental plastic using an intermediate layer consisting of an adhesive silane. An electrical potential is maintained between the metal part and an adjacent electrode, and spark discharges are triggered as a silico-organic compound is introduced into the space between the electrode and the part. In this process as well, the emphasis is on electrochemical coating, while any roughnesses that may form are considered undesirable.

These adhesion-promoting layers based on silicon oxide, according to German patent document DE 34 03 894 C1, can also be produced at high temperature on selected areas of a metal dental prosthesis by reacting an oxidizable silicon compound in the gaseous state with a flame pyrolysis burner. The flame cone of the burner is guided over the part of the dental prosthesis to be coated.

In German patent document DE 40 12 086 A1, a process with the same basis is described that is intended to produce an adhesion-promoting layer for cathodic electrophoretic dip painting. In this case, zinc, aluminum, and their alloys are used as substrate materials in addition to iron. The fact that an adhesion-promoting layer made of silane is also applied gives the process its name, i.e. the "silicoater" process.

Adhesion promoters of a completely different kind for aluminum adhesives, and therefore for aluminum materials as well, are described in German patent document DE 43 03 077 A1. The invention claimed therein relates to adhesion promoters that form a chelate complex with aluminum ions and that have a group that reacts with an epoxy resin adhesive.

The disadvantage of all processes using adhesion promoters is that they are complex multistage processes (cleaning, oxide formation, application of silane), in which, at each stage, environmentally harmful and poisonous or health-hazardous materials are used or released as byproducts.

A goal of the invention is to provide a process and an apparatus for modification of metal workpiece surfaces by electrical discharges, by which multistage processes for surface modification can be avoided and modification takes place without using environmentally harmful, poisonous, and/or health-hazardous materials.

This and other goals have been achieved according to the present invention by providing a process for treatment of a metal workpiece surface, comprising: wiring a workpiece as a cathode; triggering and maintaining pulsed unipolar arc discharges between an electrode wired as an anode and a surface of the workpiece; controlling a duration of the arc discharges in order to avoid macroscopic melting of the surface of the workpiece; and controlling a repetition rate of the arc discharges in order to avoid macroscopic melting of the surface of the workpiece, and in order to guarantee complete extinction of each individual arc discharge.

This and other goals have also been achieved according to the present invention by providing a process for treatment and adhesive assembly of a metal workpiece surface, comprising: wiring a workpiece as a cathode; arranging an electrode at a distance from a surface of said workpiece which is to be subsequently adhesively connected to another surface, said electrode being wired as an anode; triggering and maintaining pulsed unipolar arc discharges between said electrode and said surface of the workpiece; controlling a duration of the arc discharges in order to avoid macroscopic melting of the surface of the workpiece; controlling a repetition rate of the arc discharges in order to avoid macroscopic melting of the surface of the workpiece, and in order to guarantee complete extinction of each individual arc discharge; moving at least one of said electrode and said workpiece in order to treat an entirety of said surface; and adhesively connecting said surface to said another surface.

This and other goals have also been achieved according to the present invention by providing an apparatus for treatment of metal workpiece surfaces as a pretreatment for subsequent adhesive or combined assembly, comprising: a workpiece wired as a cathode; an electrode wired as an anode; a generator comprising a high-voltage pulse source and one of a pulsed-current source and a component that consists of a laser and a pulsed-current source; and a controller controlling said generator to generate electrical pulses for triggering and maintaining pulsed unipolar arc discharges between the electrode and the surface of the workpiece.

This and other goals have also been achieved according to the present invention by providing an apparatus for treatment of metal workpiece surfaces as a pretreatment for adhesive connection, comprising: a workpiece wired as a cathode; an electrode wired as an anode and arranged at a distance from a surface of said workpiece which is to be subsequently adhesively connected to another surface; a generator comprising a high-voltage pulse source and one of a pulsed-current source and a component that consists of a laser and a pulsed-current source; and a controller controlling said generator to generate electrical pulses for triggering and maintaining pulsed unipolar arc discharges between the electrode and the surface of the workpiece, said controller: (a) triggering and maintaining pulsed unipolar arc discharges between said electrode and said surface of the workpiece, (b) controlling a duration of the arc discharges in order to avoid macroscopic melting of the surface of the workpiece, and (c) controlling a repetition rate of the arc discharges in order to avoid macroscopic melting of the surface of the workpiece, and in order to guarantee complete extinction of each individual arc discharge.

According to the invention, in a process for modification of metal workpiece surfaces, by electrical discharges as pretreatment for subsequent adhesive assembly and/or combined assembly techniques, pulsed unipolar arc discharges are triggered and maintained between an electrode wired as an anode and the workpiece surface, with the workpiece being wired as a cathode, with the duration of an arc discharge being controlled in each case in order to avoid macroscopic melting of the surface of the workpiece and with the arc discharges following one another in a number and at a speed such that they do not lead to macroscopic melting of the workpiece surface and guarantee complete extinction of the individual arc discharges.

Advantageously, the arc discharges are triggered and maintained between the electrode and a part of the workpiece surface that is required for subsequent adhesive assembly and/or combined assembly techniques.

It is also advantageous that the work takes place at atmospheric pressure using active or inert gases or gas mixtures.

The present invention further provides an apparatus for modification of metal workpiece surfaces by electrical discharges as pretreatment for subsequent adhesive assembly and/or combined assembly techniques, said apparatus consisting of an electrode as the anode and a workpiece as the cathode, and a generator is also provided that consists of a high-voltage pulse source and a pulsed current source or a part that consists of a laser and a pulsed current source, to generate electrical pulses for triggering and maintaining pulsed unipolar arc discharges between the electrode and the surface of the workpiece.

It is advantageous for the high-voltage pulse source in the generator to be connected with the electrode through one diode and for the pulse current source to be connected with the electrode through another diode.

According to one advantageous embodiment, a pulsed laser and a pulsed current source are utilized, with the laser being focused on the surface of the workpiece opposite the electrode.

According to another advantageous embodiment, the radius of curvature of the electrode wired as the anode is much smaller than that of the surface of the workpiece opposite thereto.

According to another advantageous embodiment of the present invention, a gas pressure above 100 Pa is maintained in the processing chamber.

Special advantages are obtained when atmospheric pressure prevails in the processing chamber.

The present invention is also advantageously designed such that the processing chamber is flushed by a gas.

Advantages are also obtained if, in the apparatus according to the invention, the flushing gas enters the processing chamber through an opening in the electrode that is wired as the anode.

According to the present invention, in order to modify a metal workpiece surface, only pulsed unipolar (in other words, not oscillating) discharges are used, with the electrode being connected with the positive pole of a pulsed voltage source. The term "unipolar discharge" means that the current flows essentially in one direction during the entire discharge process, in other words, there is no reversal of the flow direction, and that any current flowing in the opposite direction is very small by comparison to the current in the main direction.

It has been found that with a circuit of this kind using short pulsed light arc discharges (with a duration on the order of 5 to 100 $\mu$s) it is mainly the surface of the workpiece and not the electrode (or only to a very slight degree) that is eroded. Furthermore, the brief pulses have the effect that the heat applied to the workpiece remains low. The discharges produce a local roughening of the surface of the workpiece. This roughening increases the effective surface and thus can improve the adhesion of adhesives, for example. It has been observed that this effect is pronounced in an advantageous manner when processing takes place under the influence of a gas, with a passive gas (for example a noble gas or nitrogen) or a gas that activates the surface (oxygen for example) or a mixture of gases (a mixture containing a halogen) being employed depending on the adhesive used and the materials to be joined. When the arc discharges are triggered by high-voltage breakdown, the discharge preferably begins at dielectric inclusions that can therefore be preferably eliminated. Since it is precisely these foreign substances that adhere poorly to the surface that cause problems during gluing, the desired effect is reinforced even further.

The apparatus and the process according to the present invention for modification of a metal workpiece surface using pulsed unipolar arc discharges produces a fine uniform roughening that constitutes a modification of the crystal structure in the surface area of the workpiece. As a result, in one process step and without using environmentally harmful, poisonous, and/or health-hazardous materials, a clean and oxide-free surface is produced on the metal workpieces being treated, said effect being especially advantageous for subsequent adhesive assembly and/or combined assembly techniques.

According to the process and apparatus of the present invention, the strength of adhesive assembled connections, especially glued connections, is improved. The long-term strength of such assembled connections is especially improved.

Additional advantages of the process according to the invention and the apparatus according to the invention include the following:

modification takes place in one workstep, with the processing time being adapted to the degree of contamination;

modification can be performed both completely automatically, for example by means of manipulators, and also visually, using a manual apparatus;

modification can be performed at atmospheric pressure (no vacuum process being necessary);

because the energy applied is very low and is limited to a surface layer a few microns thick, the modified workpiece can, for the most part, remain cool;

modified and unmodified or insufficiently modified areas of the individual surfaces of the workpiece can be clearly distinguished by the unaided eye;

modification can take place locally on areas of the workpiece that are relevant to subsequent assembly processes without affecting surrounding areas.

Other objects, advantages and novel features of the present invention will become apparent from the following detailed description of the invention when considered in conjunction with the accompanying drawings.

DETAILED DESCRIPTION OF THE DRAWINGS

Figure 1:
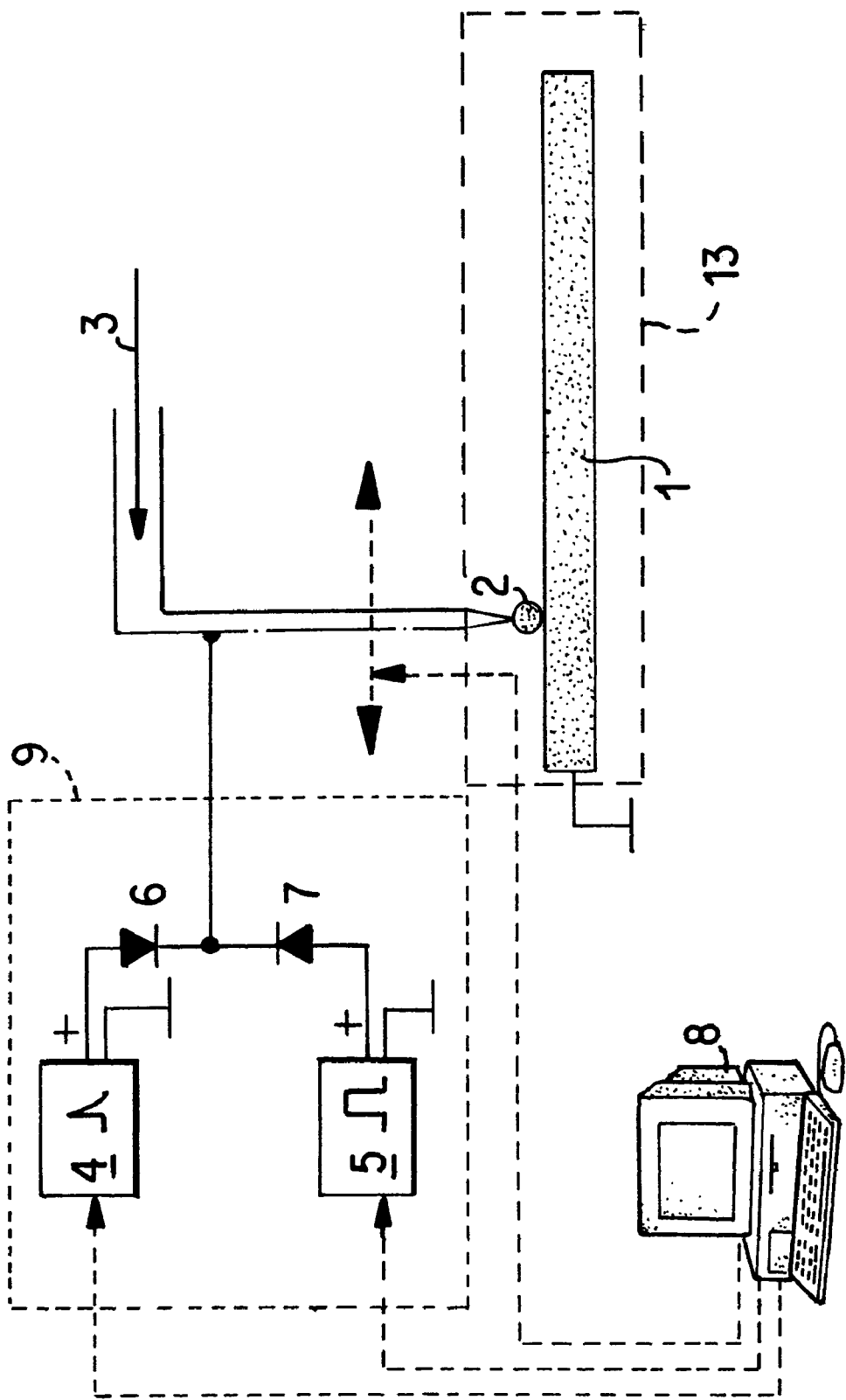
FIG. 1 is a schematic view of an apparatus and a method according to a preferred embodiment of the present invention.
Figure 2A:
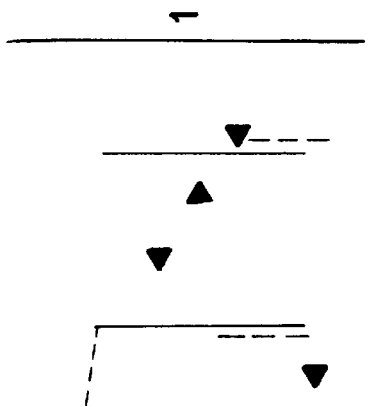
FIG. 2a is an enlarged view of the electrode of the treatment head.
Figure 2B:
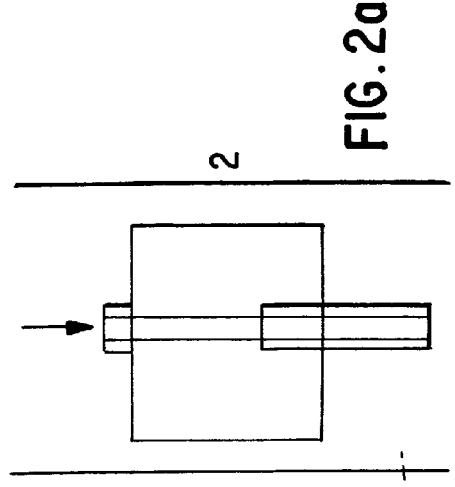
FIG. 2b is an enlarged view of the workpiece.
Figure 2:
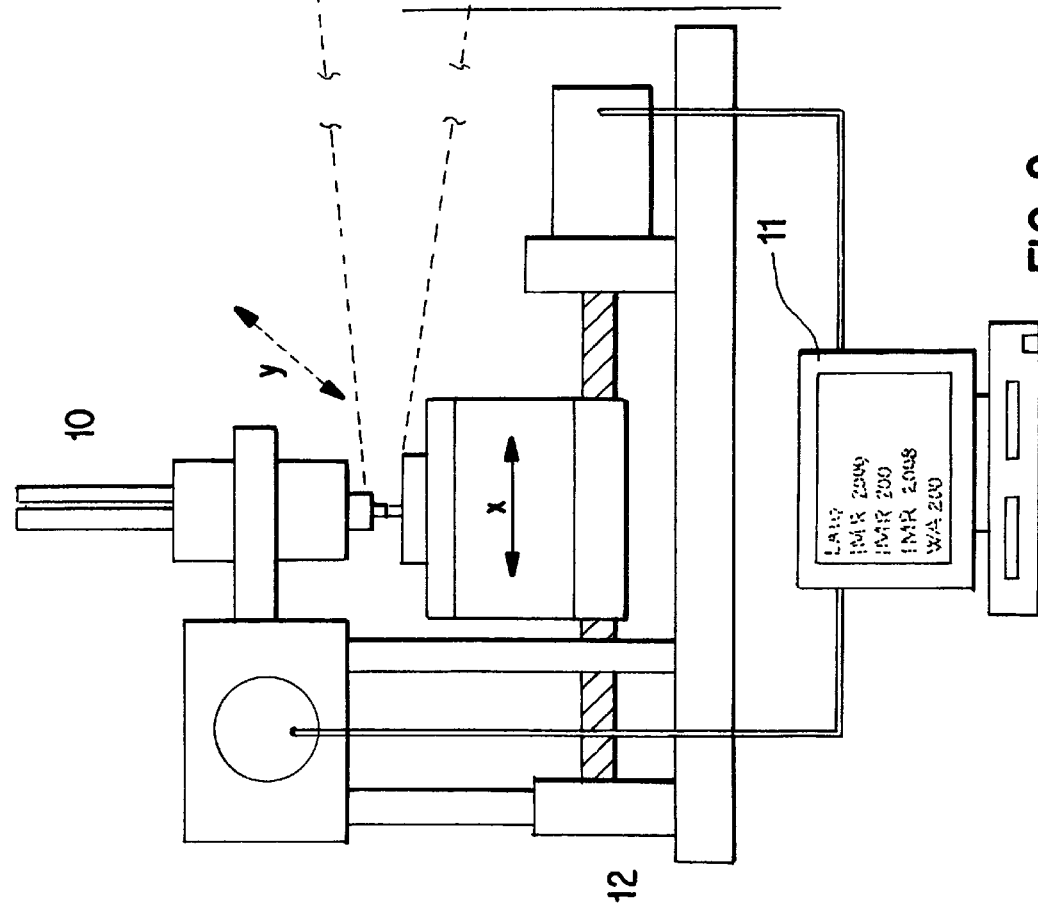
FIG. 2 is a perspective view of the treatment head and the workpiece control apparatus.

As schematically shown in FIGS. 1–2b, an apparatus according to the present invention includes a working head (10) including a pointed electrode (2) arranged at a distance from a surface of a metal workpiece (1) in a processing chamber (13). The electrode (2) contains an opening which communicates an interior of the processing chamber (13) with a gas supply (3). The gas supply may be an active gas, an inert gas, or a gas mixture.

A generator (9) is used to generate signals which are fed to the electrode (2). A high-voltage pulse source (4) in the generator is connected with the electrode (2) through one diode (6), and a pulse current source (5) is connected with the electrode (2) through another diode (7). The generator (4) is controlled by a process computer (8).

As schematically indicated by the double-ended arrow in FIG. 1, the working head (10) and electrode (2) may be movable in one, two, or three dimensions, with the surface of the workpiece (1) remaining fixed, in order to treat the entire desired surface. In this case, the means for moving the electrode (2) is controlled by process computer (8). Alternatively, as shown in FIG. 2, the workpiece (1) may be movable in one, two, or three dimensions via a displacement device (12), with the working head (10) and electrode (2) remaining fixed, in order to treat the entire desired surface. In this case, the displacement device (12) includes, for example, step-motors, and is controlled by a control computer (11). The control computer (11) may also act as the process computer for control of the generator, or may be separate therefrom.

Figure 3A:
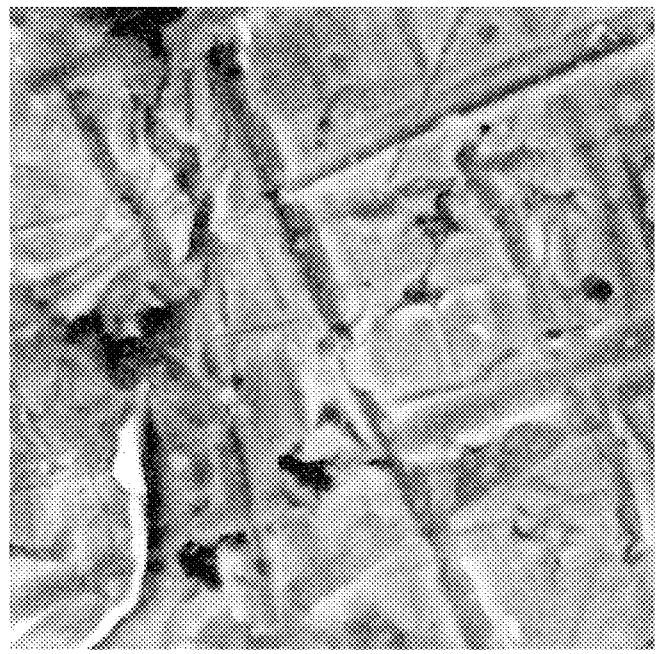
FIG. 3a is an enlarged view of a workpiece surface prior to treatment.
Figure 3B:
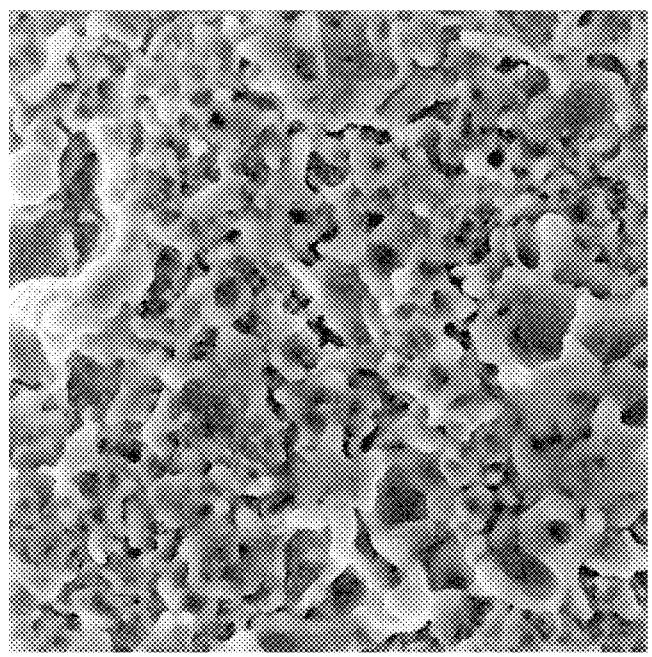
FIG. 3b is an enlarged view of the workpiece surface of FIG. 3a after treatment.

FIG. 3a is an electron micrograph scan of a surface of a workpiece made of aluminium prior to treatment with the present invention, which is magnified approximately 1000×. FIG. 3b is an enlarged view of the workpiece surface of FIG. 3a after treatment with the present invention, at the same magnification.

Following are examples of surface treatments conducted utilizing the process and apparatus of the present invention.

EXAMPLE 1

A pointed electrode with an axial bore was moved over a workpiece made of an aluminum alloy, at a constant distance of about 2 mm. $N_2$ flowed out of the opening in the electrode over the surface of the workpiece. A high-voltage pulse source generated short high-voltage pulses (<1 $\mu$s) that caused the charged pulsed-current source (current 50 A, pulse duration 20 $\mu$s) to discharge between the workpiece and the electrode. Two diodes ensured that the high-voltage pulse did not affect the pulse source and that the discharge proceeded pulsewise and unipolarly, with the workpiece always being the cathode and the pointed electrode always being the anode. After the discharge was extinguished, the pulsed-current source was recharged. After a pause of about 10 ms, the next high-voltage pulse was triggered, and thus the next discharge. During this time, the workpiece was advanced slowly so that the entire area to be pretreated for gluing was modified uniformly. About 5000 discharges per $cm^2$ were triggered. The movement of the workpiece, the high-voltage pulse triggering, and the recharging process of the pulsed-current source were controlled by a process computer.

The test showed that the surface of the workpiece was roughened homogeneously and thin, nonmetal layers (oil residues, oxides, and other impurities) were removed completely.

It was also apparent that the modified workpiece surface, despite the increase in the surface produced by roughening, was more resistant to corrosion than an unmodified surface and that it was possible to produce high-strength adhesive connections without any other pretreatment. Previous degreasing likewise proved to be unnecessary.

EXAMPLE 2

The task consisted in cleaning a steel panel as the workpiece, said panel being covered with a thin coating of deep-drawing oil (oil film thickness approximately 1–5 $\mu$m) from a previous processing step, in one workstep, and simultaneously pretreating it for gluing. For this purpose, a pointed electrode with an axial bore was moved over the area of the workpiece to be processed, at a constant distance of about 2 mm. Argon flowed out of the opening in the electrode over the surface of the workpiece. An Nd-YAG pulsed laser produced short pulses of radiation (wavelength 1.06 $\mu$m, pulse duration 90 ns, pulse energy 10 mJ) that was focused on the surface of the workpiece, with the focus itself being located on the surface of the workpiece directly below the pointed electrode. The focused laser radiation triggered a discharge between the electrode and the workpiece so that the pulsed current source (charge voltage 500 V, impedance 10 $\Omega$, current duration 50 $\mu$s) discharged between the workpiece and the electrode, with the workpiece always being the cathode. After the discharge was extinguished, the pulsed-current source was recharged. After a pause of 7 ms, the next laser pulse and thus the next discharge was triggered. At the same time, the workpiece was advanced slowly so that the entire area to be cleaned and prepared for gluing was treated uniformly. For this purpose, 10,000 discharges per $cm^2$ were triggered. The movement of the workpiece, the triggering of the pulses, and the recharging processes of the pulsed-current source were controlled by a process computer.

The experiments showed that the surface of the workpiece was roughened homogeneously and the deep-drawing oil residue was removed completely.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for roughening a metal workpiece surface, comprising:
    wiring a workpiece as a cathode;
    triggering and maintaining pulsed unipolar arc discharges between an electrode wired as an anode and a surface of the workpiece, said pulsed unipolar arc discharges eroding the workpiece to roughen said surface of the workpiece;
    controlling a duration of the arc discharges in order to avoid macroscopic melting of the surface of the workpiece; and
    controlling a repetition rate of the arc discharges in order to avoid macroscopic melting of the surface of the workpiece, and in order to extinguish each individual arc discharge.

2. A process according to claim 1, further comprising moving at least one of said electrode and said workpiece in order to treat an entirety of said surface.

3. A process according to claim 1, wherein the arc discharges are triggered and maintained between the electrode and a part of the surface of the workpiece that is to be subsequently assembled in at least one of an adhesive assembly and a combined assembly.

4. A process according to claim 1, further comprising treating said surface in a processing chamber while maintaining one of an active gas, an inert gas, and a gas mixture in said processing chamber at atmospheric pressure.

5. A process according to claim 1, wherein said electrode is not eroded by said pulsed unipolar arc discharges.

6. A process according to claim 1, wherein said electrode is eroded only to a slight degree by said pulsed unipolar arc discharges.

7. A process according to claim 1, wherein said electrode is made of an electrode material, and wherein said electrode material is not deposited on said surface of the workpiece during said process.

8. A process according to claim 1, wherein said pulsed unipolar arc discharges clean said surface of the workpiece.

9. A process according to claim 1, wherein said pulsed unipolar arc discharges produce a fine uniform roughening that constitutes a modification of the crystal structure of said surface of the workpiece.

10. A process according to claim 1, wherein said electrode remains spaced apart from said workpiece throughout said process.

11. A process for roughening and adhesive assembly of a metal workpiece surface, comprising:

wiring a workpiece as a cathode;

arranging an electrode at a distance from a surface of said workpiece which is to be subsequently adhesively connected to another surface, said electrode being wired as an anode;

triggering and maintaining pulsed unipolar arc discharges between said electrode and said surface of the workpiece, said pulsed unipolar arc discharges eroding the workpiece to roughen said surface of the workpiece;

controlling a duration of the arc discharges in order to avoid macroscopic melting of the surface of the workpiece;

controlling a repetition rate of the arc discharges in order to avoid macroscopic melting of the surface of the workpiece, and in order to extinguish each individual arc discharge;

moving at least one of said electrode and said workpiece in order to treat an entirety of said surface; and adhesively connecting said surface to said another surface.

12. A process according to claim 11, wherein said electrode is not eroded by said pulsed unipolar arc discharges.

13. A process according to claim 11, wherein said electrode is eroded only to a slight degree by said pulsed unipolar arc discharges.

14. A process according to claim 11, wherein said electrode is made of an electrode material, and wherein said electrode material is not deposited on said surface of the workpiece during said process.

15. A process according to claim 11, wherein said pulsed unipolar arc discharges clean said surface of the workpiece.

16. A process according to claim 11, wherein said pulsed unipolar arc discharges produce a fine uniform roughening that constitutes a modification of the crystal structure of said surface of the workpiece.

17. A process according to claim 11, further comprising treating said surface in a processing chamber while maintaining one of an active gas, an inert gas, and a gas mixture in said processing chamber at atmospheric pressure.

18. A process for simultaneously cleaning and roughening a surface of a metal workpiece prior to adhesive assembly of the metal workpiece, comprising:

wiring the metal workpiece as a cathode;

arranging an electrode at a distance from a surface of said workpiece which is to be subsequently adhesively connected to another surface, said electrode being wired as an anode;

triggering and maintaining pulsed unipolar arc discharges between said electrode and said surface of the workpiece, said pulsed unipolar arc discharges eroding the workpiece to roughen said surface of the workpiece, said pulsed unipolar arc discharges removing contaminants from said surface of the workpiece.

19. A process according to claim 18, further comprising controlling a duration of the arc discharges in order to avoid macroscopic melting of the surface of the workpiece.

20. A process according to claim 19, further comprising controlling a repetition rate of the arc discharges in order to avoid macroscopic melting of the surface of the workpiece, and in order to extinguish each individual arc discharge.

21. A process according to claim 18, further comprising adhesively connecting said surface to said another surface.

* * * * *